United States Patent
Barents et al.

(10) Patent No.: US 11,709,042 B2
(45) Date of Patent: Jul. 25, 2023

(54) CRUISE MISSILE WEAPON ACTIVE HAZARD MITIGATION SYSTEM

(71) Applicant: Raytheon Company, Waltham, MA (US)

(72) Inventors: Dennis D. Barents, Tucson, AZ (US); Kim L. Christianson, Oro Valley, AZ (US); Aaron C. Lattimore, Tucson, AZ (US); Andrew K. Knight, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 810 days.

(21) Appl. No.: 16/716,551

(22) Filed: Dec. 17, 2019

(65) Prior Publication Data
US 2021/0278182 A1  Sep. 9, 2021

(51) Int. Cl.
| | |
|---|---|
| *F42B 15/34* | (2006.01) |
| *H01M 10/613* | (2014.01) |
| *H01M 10/625* | (2014.01) |
| *F41A 17/06* | (2006.01) |
| *F42B 12/20* | (2006.01) |

(Continued)

(52) U.S. Cl.
CPC .............. *F42B 15/34* (2013.01); *F41A 17/06* (2013.01); *F42B 12/207* (2013.01); *F42B 15/36* (2013.01); *F42B 39/14* (2013.01); *F42B 39/20* (2013.01); *F42C 15/00* (2013.01); *G01K 3/005* (2013.01);

(Continued)

(58) Field of Classification Search
CPC ............ F01D 15/10; F02C 7/141; F02C 7/18; F02C 7/36; F02C 1/05; F02C 6/12; F05D 2220/76; F05D 2260/213; F05D 2260/232; F05D 2260/606; F05D 2220/62; F02B 37/04; F02K 5/00; H01M 8/04014; H01M 8/04111; H01M 8/04201
See application file for complete search history.

(56) References Cited

U.S. PATENT DOCUMENTS

| | | | |
|---|---|---|---|
| 4,961,313 A | 10/1990 | Dolan | |
| 6,121,882 A | 9/2000 | Jaul | |

(Continued)

FOREIGN PATENT DOCUMENTS

| | | |
|---|---|---|
| EP | 0163086 | 12/1985 |

OTHER PUBLICATIONS

International Search Report and Written Opinion dated Feb. 8, 2021 for corresponding International Application No. PCT/US2020/054515.

*Primary Examiner* — Jacob M Amick
*Assistant Examiner* — Charles J Brauch
(74) *Attorney, Agent, or Firm* — Renner, Otto, Boisselle & Sklar, LLP

(57) ABSTRACT

A mitigation control system is arranged in an environment containing an energetic material and includes an abnormal temperature sensor for detecting an abnormal temperature of the environment, a power source that is mechanically actuated by the abnormal temperature sensor when the abnormal temperature exceeds a predetermined abnormal temperature threshold, a mitigation controller that is actuated by the power source, and a plurality of local temperature sensors that are communicatively coupled to the mitigation controller and are arranged for detecting critical temperatures in specific regions of the environment. The mitigation controller executes a mitigation action when one of the critical temperatures exceeds a predetermined critical temperature threshold for the corresponding specific region.

9 Claims, 5 Drawing Sheets

(51) Int. Cl.
  *F42B 15/36* (2006.01)
  *F42B 39/20* (2006.01)
  *G01K 3/00* (2006.01)
  *H01M 10/48* (2006.01)
  *F42B 39/14* (2006.01)
  *F42C 15/00* (2006.01)
(52) U.S. Cl.
  CPC ....... *H01M 10/486* (2013.01); *H01M 10/613* (2015.04); *H01M 10/625* (2015.04)

(56) References Cited

U.S. PATENT DOCUMENTS

| | | |
|---|---|---|
| 2006/0027086 A1 | 2/2006 | Boyer, Jr. |
| 2017/0350681 A1 | 12/2017 | Campbell |

CRUISE MISSILE WEAPON ACTIVE HAZARD MITIGATION SYSTEM

FIELD OF THE INVENTION

The invention relates to a system and method for mitigating hazardous reactions when an environment containing an energetic material is subject to unplanned stimuli.

DESCRIPTION OF THE RELATED ART

Various applications may use energetic materials that are able to release stored chemical energy. Examples of environments in which energetic materials are contained include weapon systems, such as cruise missiles, and other transportation systems. During operation, such as during execution of a mission, the environment containing the energetic material may be subject to external and unplanned stimuli. For example, a cruise missile may be subject to a thermal threat when the weapon is unexpectedly impacted. When subject to the unplanned stimuli, a violent energetic response from the energetic material in the environment may occur. The responses may cause collateral damage to weapon platforms, logistic systems, and personnel.

In military applications, insensitive munitions are required to have safety measures when subject to unplanned stimuli. The requirements are based upon a military standard MIL-STD-2105D which requires the energetic response to have an ejecta kinetic energy that is less than 20 joules (15 foot-pound force). For example, the requirements may include meeting STANAG 4439 standards. Different types of MIL-STD-2105D energetic responses include six different types of mitigation reactions that have different levels of violence. The most violent reactions include a Type I detonation reaction during which energetic material of the munition system is consumed in a supersonic decomposition, a Type II partial detonation reaction during which some of the energetic material is consumed in the supersonic decomposition, a Type III explosion reaction during which sub-sonic decomposition of energetic material and extensive fragmentation occurs, and a Type IV deflagration reaction during which ignition and burning of confined energetic materials occurs.

The least violent reactions include a Type V burning reaction during which the energetic material ignites and burns non-propulsively, and a Type VI no reaction during which any reaction self-extinguishes immediately upon removal of the external stimuli. The less violent Type V and VI reaction types are preferable to the more violent reactions.

Providing mitigation in some environments, such as in integrated weapon systems, is difficult due to the complexity of providing a mitigation solution for each sub-assembly which contains unique components and has different characteristics relative to the other sub-assemblies. Some integrated systems include sub-assemblies with both solid and liquid energetic materials that require different mitigation techniques. Launch systems in which the weapon is stored in a canister also present challenges in mitigation due to the impact of the canister when detecting thermal threats. For example, the canister may prohibit or hinder the activation of a subsystem mitigation system.

SUMMARY OF THE INVENTION

The mitigation control system described herein is configured to minimize the probability of an uncontrolled initiation and to minimize the severity of subsequent collateral damage to weapon platforms, logistic systems and personnel due to accidental threats. The mitigation control system includes a hybrid sensor system having both passive and active sensors that are used to detect thermal threats in an environment containing an energetic material. The mitigation control system uses a controller that configures and validates a network of sensors, such as temperature sensors, pressure sensors, or other suitable sensors, to analyze the environment. If the analysis indicates a possible threat, the system will send a notification signal, continue to monitor, and predict when a mitigation event is likely to occur. If the analysis indicates that mitigation is necessary, a power supply is activated and a fire pulse may be generated to initiate a mitigation energetic, such as a linear shape charge.

The sensors are used in conjunction with a mitigation controller that is configured to execute a specific mitigation action or technique for a specific region within the environment. The passive temperature sensor is used to detect an abnormal temperature of the environment. When the abnormal temperature exceeds a predetermined threshold indicating that the environment is subject to unplanned external stimuli causing a thermal threat, the abnormal temperature sensor mechanically triggers a power source. The environment containing the energetic material may be a transportation vehicle, such as an air vehicle or cruise missile, and the passive temperature sensor detects the abnormal temperature outside of the vehicle body. In a launch system in which the missile is arranged in a canister, the passive temperature sensor may be mounted to the canister for detecting the abnormal temperature around the canister.

The power source may include a thermal battery, a capacitor, an external power source such as the platform, or any other suitable power source. The mitigation controller is subsequently electrically actuated via the power source which may supply a current to the mitigation controller to transition the mitigation controller from a normal sleep mode to a power on mode. The mitigation controller is communicatively coupled with a plurality of local sensors that are arranged at different regions within the environment. For example, the sensors may be temperature or pressure sensors. In the air vehicle body, the local temperature sensors are arranged in different sub-assemblies that are integrated to form the main air vehicle body. The local temperature sensors are configured to detect the temperature in each region or sub-assembly.

When a detected temperature exceeds a predetermined critical temperature threshold for the specific region or sub-assembly, the mitigation controller is configured to initiate a mitigation action or technique corresponding to the region in which the critical temperature has been reached. An active cell battery or any other suitable method for receiving anti-radiation missile power powers the control system from the initial trigger temperature to initiation. The active cell battery powers a fire pulse and provides sustain logic after initiation. The mitigation controller includes a power management subsystem to constantly monitor the power. The power monitoring is used to ensure that there is enough power to activate a firing detonator or initiator, or other intended function.

The mitigation controller communicates with a plurality of mitigation subcontrollers that are each arranged in the different regions and configured to execute the specific mitigation action or technique corresponding to the region. The mitigation action or technique may be different for each region and the mitigation action or technique may be passive or active. Examples of mitigation actions or techniques include at least one of venting, shielding, painting, using shear bolts or stress raisers, softening a component within the environment, igniting the energetic material below an ignition temperature for the energetic material, using a thermal initiated venting system for fuel release or component cutting, performing a controlled burn, controlling a location of ignition within the environment, or perform an early ignition of the energetic material. A cruise missile may include warhead, fuel tank, jet engine, and booster sub-assemblies that each have a separate mitigation subcontroller. The mitigation subcontroller for the fuel tank sub-assembly may execute a fuel release sequence that enables a controlled burn without increasing the pressure inside the cruise missile body, whereas the mitigation subcontrollers for the warhead sub-assembly and the rocket motor sub-assembly may each perform venting or a cutting sequence for the warhead or motor to reduce violence to thermal insensitive munition threats.

The mitigation control system is advantageous in ensuring effective mitigation by providing sub-assembly compliance using a system level control unit. In military applications, the system may be used to achieve military standard MIL-STD-2105D Type V or Type VI energetic responses that are less violent as compared with other possible energetic responses to unplanned stimuli. Using both passive and active temperature sensors also enables the mitigation controller to rest in an unpowered or low powered state until the thermostat-type passive sensor detects a thermal threat. Still another advantage of the mitigation control system is implementing the mitigation control system in a launch system in which the mitigation actions or techniques for the sub-assemblies will not be hindered when the missile is arranged in a canister.

According to an aspect of the invention, a mitigation control system includes passive and active sensors.

According to an aspect of the invention, a mitigation control system includes an active hazard mitigation unit.

According to an aspect of the invention, a mitigation control system includes mitigation subcontrollers that are each arranged in the different regions and configured to execute the specific mitigation action or technique corresponding to the region.

According to an aspect of the invention, a mitigation control system is arranged in an environment containing an energetic material and the mitigation control system includes an abnormal temperature sensor for detecting an abnormal temperature of the environment, a power source that is mechanically actuated by the abnormal temperature sensor when the detected temperature exceeds a predetermined temperature threshold, a mitigation controller that is electrically actuated by the power source, and a plurality of local temperature sensors, or other environmental sensors, that are communicatively coupled to the mitigation controller and are arranged for detecting critical temperatures in specific regions of the environment, wherein the mitigation controller initiates a mitigation action when one of the critical temperatures in a corresponding one of the specific regions exceeds a predetermined critical temperature threshold.

According to an embodiment of any paragraph(s) of this summary, the abnormal temperature sensor is a passive sensor and the plurality of local temperature sensors are active sensors.

According to an embodiment of any paragraph(s) of this summary, the power source includes a self-contained battery or power from an external source.

According to an embodiment of any paragraph(s) of this summary, the mitigation controller has a sleep mode and the thermal battery is configured to supply current to the mitigation controller for transitioning the mitigation controller to a power on mode from the sleep mode.

According to an embodiment of any paragraph(s) of this summary, the mitigation control system includes a plurality of mitigation subcontrollers that are each arranged in different specific regions of the environment and configured to execute a predetermined mitigation action or technique for the corresponding specific region.

According to an embodiment of any paragraph(s) of this summary, the mitigation action or technique is passive or active.

According to an embodiment of any paragraph(s) of this summary, the passive action or technique includes at least one of venting, shielding, painting, using shear bolts or stress raisers, and softening a component within the environment.

According to an embodiment of any paragraph(s) of this summary, the active action or technique includes at least one of igniting the energetic material below an ignition temperature for the energetic material, using a thermal initiated venting system for fuel release or component cutting, performing a controlled burn, controlling a location of ignition within the environment, performing an early ignition of the energetic material, and weakening a component within the environment.

According to an embodiment of any paragraph(s) of this summary, the environment is a transportation vehicle.

According to another aspect of the invention, an air vehicle containing an energetic material includes a main body formed of a plurality of integrated sub-assemblies, and a mitigation control system that is arranged in the main body and includes a passive temperature sensor for detecting an abnormal temperature of the main body, a power source that is mechanically actuated by the passive temperature sensor when the detected abnormal temperature exceeds a predetermined abnormal temperature threshold, a mitigation controller that is electrically actuated by the power source, and a plurality of active temperature sensors that are communicatively coupled to the mitigation controller and are each embedded in a different one of the sub-assemblies for detecting a critical temperature of the corresponding sub-assembly. The mitigation controller executes a mitigation action or technique when the detected critical temperature exceeds a predetermined critical temperature threshold for the corresponding sub-assembly.

According to an embodiment of any paragraph(s) of this summary, the power source includes a self-contained battery or power from an external source.

According to an embodiment of any paragraph(s) of this summary, the air vehicle includes a plurality of mitigation subcontrollers that are arranged in different sub-assemblies and configured to execute a predetermined mitigation action for the corresponding sub-assembly.

According to an embodiment of any paragraph(s) of this summary, the mitigation action or technique is passive or active.

According to an embodiment of any paragraph(s) of this summary, the passive action or technique includes at least one of venting, shielding, painting, using shear bolts or stress raisers, and softening a component within the air vehicle.

According to an embodiment of any paragraph(s) of this summary, the active action or technique includes at least one of igniting the energetic material below an ignition temperature for the energetic material, using a thermal initiated venting system for fuel release or component cutting, performing a controlled burn, controlling a location of ignition within the air vehicle, performing an early ignition of the energetic material, and weakening a component within the air vehicle.

According to an embodiment of any paragraph(s) of this summary, the air vehicle is a cruise missile having energetic materials that are solid and/or liquid.

According to an embodiment of any paragraph(s) of this summary, the plurality of integrated sub-assemblies include a warhead, a fuel tank, a jet engine, and a booster.

According to an embodiment of any paragraph(s) of this summary, the mitigation action or technique includes an energetic response that is a MIL-STD-2105D military standard Type V burning reaction response or a Type VI no reaction response.

According to an embodiment of any paragraph(s) of this summary, the air vehicle is arranged in a launch system having a canister in which the air vehicle is stored, and the at least one passive temperature sensor is mounted to the canister.

According to still another aspect of the invention, a method for mitigating an active hazard in an air vehicle containing an energetic material includes detecting an abnormal temperature of the air vehicle, mechanically actuating a power source when the detected temperature exceeds a predetermined temperature threshold, electrically actuating a mitigation controller after the power source is actuated, detecting a critical temperature in separate sub-assemblies that are integrated to form the air vehicle after the mitigation controller is actuated, and executing a mitigation action or technique in at least one of the different sub-assemblies using the mitigation controller when the critical temperature in the corresponding sub-assembly exceeds a predetermined critical temperature threshold.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

The principles described herein have application in any environment that contains an energetic material and requires a mitigation action or technique to control a reaction of the energetic material when subject to a thermal threat. Energetic materials include materials that are able to release stored chemical energy. Exemplary materials include explosives, pyrotechnic compositions, propellants, and other fuel or oxidizer mixtures. Suitable platforms that may include an energetic material and a mitigation control system for the energetic material include air, land, space, and sea vehicles in defense applications or other military applications. The platform may be stationary or moving. Manned or unmanned platforms may be suitable. Weapons including cruise missiles are suitable platforms. Other exemplary applications include transportation systems and vehicles, communication-type applications, and laboratory environments.

Figure 1:
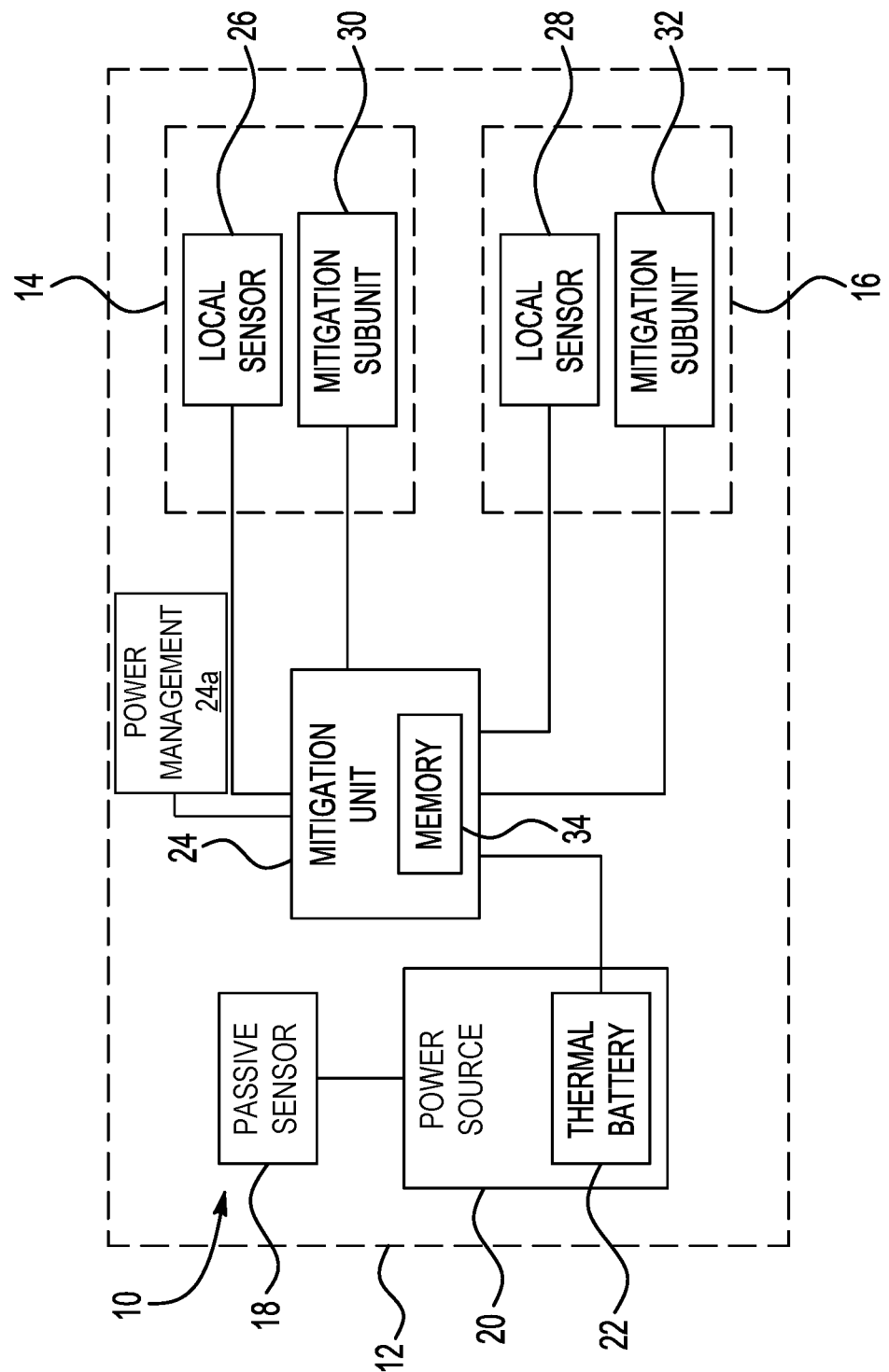
FIG. 1 shows a mitigation control system for an environment containing an energetic material.

Referring first to FIG. 1, a mitigation control system 10 is shown. The mitigation control system 10 is arranged in an environment 12 containing an energetic material. The environment 12 may be an enclosure and any suitable platform may include the environment 12, such as a transportation vehicle. Different compartments or regions 14, 16 may form the environment 12 or be a part of the environment 12. The regions 14, 16 may be separated relative to each other and enclosed within the environment 12. In exemplary applications, the regions 14, 16 may be integrated or interact with each other to form the entire environment. Each region 14, 16 is different and includes a corresponding component or a set of components that are configured to perform a function for the specific region 14, 16. For example, in an application in which the environment 12 is an air vehicle, the regions 14, 16 may be sub-assemblies of the air vehicle that are integrated to form the main vehicle body. Exemplary sub-assemblies for an air vehicle include a fuel tank body and a jet engine body that contain a fuel tank and a jet engine, respectively, that are integrated for operation of the air vehicle.

The mitigation control system 10 includes at least one abnormal temperature sensor 18 for sensing an abnormal temperature of the environment 12. The abnormal temperature may be a temperature within the environment 12 or directly outside the enclosure of the environment 12. The abnormal temperature sensor 18 is a passive sensor and includes a mechanical activation element to determine if a temperature in the environment 12 exceeds a predetermined temperature threshold that corresponds to an energetic hazard onset. Any suitable thermostat-type of passive sensor may be used and the sensor may include a thermal switch, a bimetallic thermometer, or any other suitable thermometer. The abnormal temperature sensor 18 may be mounted within the environment 12 and the arrangement of the abnormal temperature sensor 18 may be dependent on the environment 12 and the enclosure for the environment 12. A plurality of abnormal temperature sensors 18 may be provided and arranged at different locations around the environment 12. Using the passive abnormal temperature sensor 18 is advantageous in that the sensor does not require an external power source and is only used to detect when the abnormal temperature exceeds the threshold, as compared with the more complex arrangement of an active sensor that would require an external power source. Accordingly, the mitigation control system 10 may remain in an unpowered or low powered state until the passive abnormal temperature sensor 18 detects the thermal threat.

The mitigation control system 10 further includes a power source 20 that is coupled to the abnormal temperature sensor 18 and is mechanically activated by the mechanical activation element of the abnormal temperature sensor 18 when the detected abnormal temperature exceeds the predetermined threshold corresponding to thermal threats. The power source 20 may include a thermal battery 22 having an initiation element that is mechanically activated by the activation element of the abnormal temperature sensor 18. If the mitigation control system 10 determines that mitigation is necessary, the power source 20 is activated and a fire pulse may be generated to initiate a mitigation energetic, such as a linear shape charge. For example, a thermal batter initiator may be squibbed. Any other suitable power source may be used, including capacitors or other external power sources, such as power from the platform itself.

A mitigation controller or an active hazard mitigation unit (AHMU) 24 is communicatively coupled to the power source 20 and is electrically actuated by the power source 20, subsequently to the actuation of the power source 20. The AHMU 24 may be configured to monitor. The power source 20 may be electrically coupled to the AHMU 24 for supplying current to the AHMU 24 to actuate the AHMU 24. The AHMU 24 may have be in a sleep or low power mode prior to receiving the current which wakes up the AHMU 24 and transitions the AHMU 24 from the sleep mode into a power on mode. The mitigation controller may include a power management subsystem 24a to constantly monitor the power. The mitigation controller includes a power management subsystem to constantly monitor the power. The power monitoring is used to ensure that there is enough power to activate a firing detonator or initiator, or other intended function.

A local temperature network or sensor array is formed of a plurality of local temperature sensors 26, 28 that are each arranged in a corresponding one of the regions 14, 16 of the environment 12 and communicatively coupled with the AHMU 24. The temperature sensors may also include other environmental sensors. The local temperature sensors 26, 28 are active sensors that detect local temperatures in the regions 14, 16 of the environment 12 and send data corresponding to the detected temperatures back to the AHMU 24 which determines whether the detected temperatures exceed a predetermined critical temperature for the region 14, 16. Each region 14, 16 may have a different critical temperature that is dependent on the temperature at which self-heating reactions may occur for the specific region 14, 16.

Each region 14, 16 may have a mitigation subcontroller 30, 32 that is arranged in the region 14, 16 and configured to execute a specific mitigation action or technique for the corresponding region 14, 16. Each mitigation subcontroller 30, 32 may be arranged to execute a different mitigation action or technique which is passive or active. A passive mitigation action of technique includes any mitigation action or technique that does not cause a response from the energetic material. For example, a passive mitigation action or technique includes an action that does not contain energetic substance or generate any explosive effect. An active mitigation action or technique includes any action causing a thermal or explosive effect to cause an energetic response. Examples of suitable passive mitigation actions or techniques include providing venting paths in the environment 12, shielding components, painting a component with a protective coating, using shear bolts or stress raisers to localize stress in a specific area, or softening a component within the region 14, 16. Examples of suitable active mitigation actions or techniques include igniting the energetic material below an ignition temperature for the energetic material, using a thermal initiated venting system for fuel release or component cutting, performing a controlled burn, controlling a location of ignition within the environment 12, performing an early ignition of the energetic material, and weakening a component within the environment 12. Many other mitigation actions or techniques may be executed.

The AHMU 24 may be entirely implemented in any suitable hardware and may be autonomous. The AHMU 24 is configured to monitor. If the analysis indicates a possible threat, the system will send a notification signal, continue to monitor, and predict when a mitigation event is likely to occur. Fuse-based configurable logic may be suitable for implementing the AHMU 24. The AHMU 24 prediction and mitigation of hazards is based on collected inputs over time, and the AHMU 24 may be configured to determine the appropriate outcome based on the collected data. The determination of a time and/or a thermal threshold to initiate a non-reversible mitigation sequence may be configurable. The AHMU 24 may be configured to adapt to the thermal environment and manage the power sources to minimize potential hazards. For example, if the threat is not increasing, the AHMU 24 is configured to continue to monitor at a slower rate.

A memory 34 may be arranged in the AHMU 24 and configured to store data pertaining to different mitigation actions that correspond to the detected critical temperature for the corresponding region 14, 16. The memory 34 may also store an algorithm or executable commands pertaining to assessing the data received from the local temperature sensors 26, 28 and determining the appropriate mitigation action based on the detected data. When the AHMU 24 receives data from the local temperature sensors 26, 28, the AHMU 24 is configured to communicate with the mitigation subcontrollers 30, 32 to initiate the mitigation action.

Figure 2:
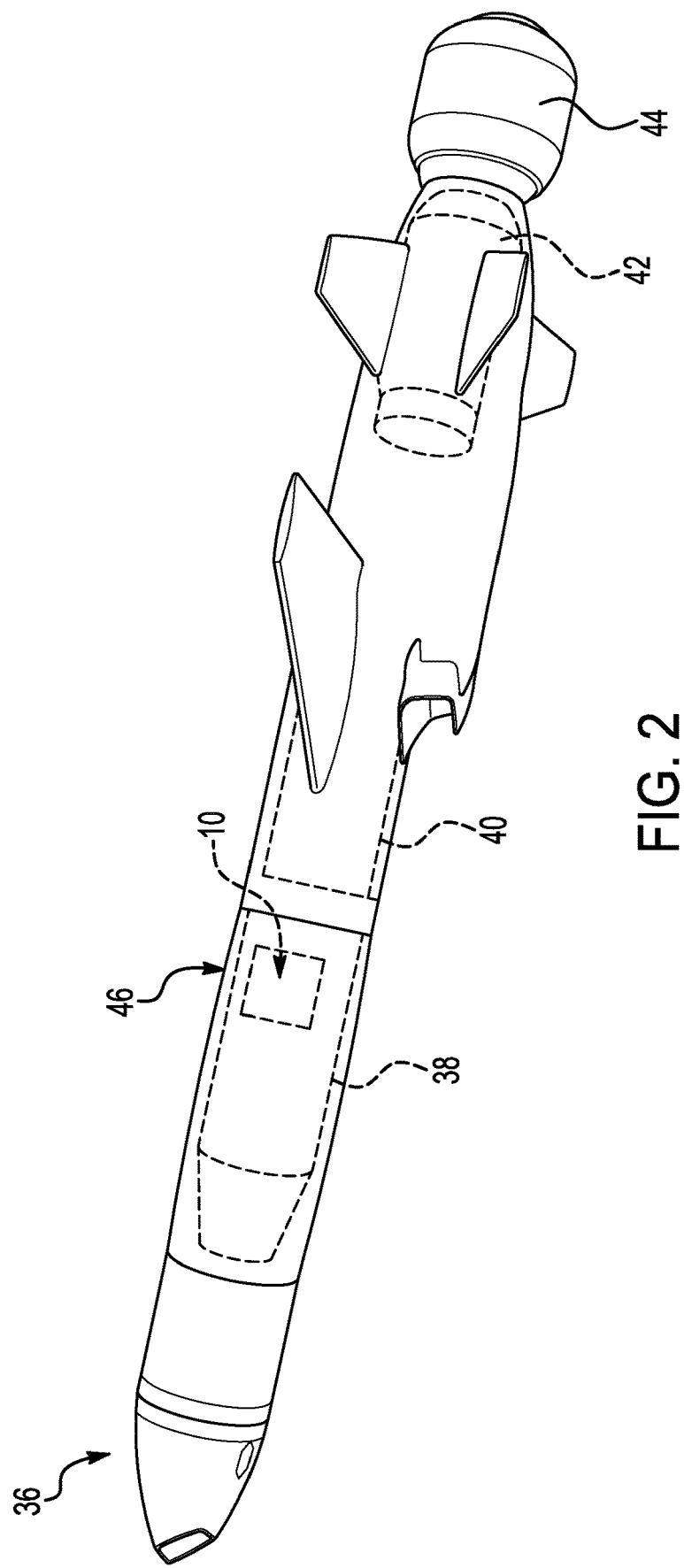
FIG. 2 shows a cruise missile having sub-assemblies that are integrated to form the cruise missile body.
Figure 3:
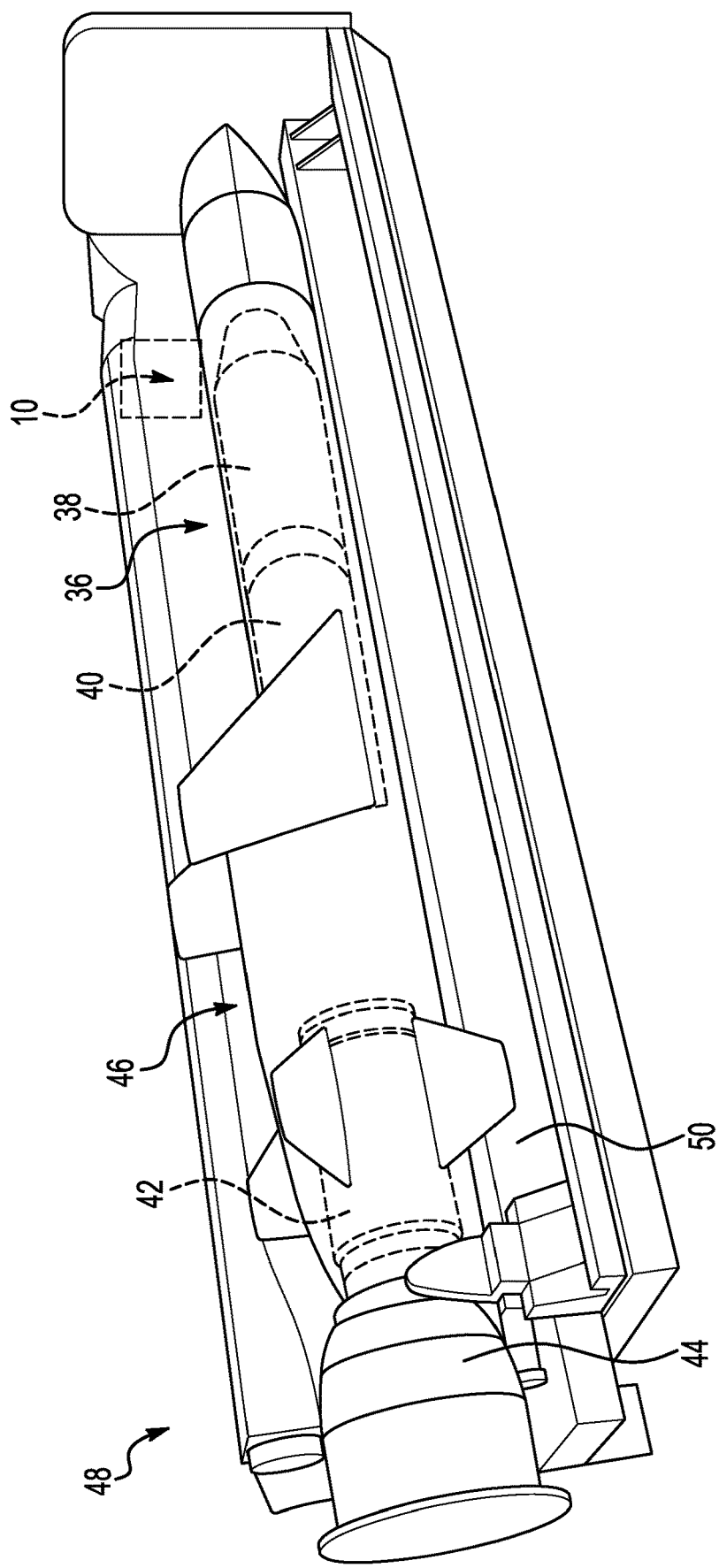
FIG. 3 shows a launch system in which the cruise missile of FIG. 2 is arranged in a canister.

Referring now to FIGS. 2 and 3, an exemplary air vehicle 36 is shown. The air vehicle 36 may be a suitable environment 12 for the mitigation control system 10, as shown in FIG. 1. In an exemplary embodiment, the air vehicle 36 may be a weapon such as a cruise missile. A plurality of sub-assemblies 38, 40, 42, 44 are integrated with each other to form a main body 46 of the air vehicle 36. In an exemplary configuration of the air vehicle 36, the sub-assemblies 38, 40, 42, 44 may include a warhead module 38, a fuel tank module 40, a jet engine module 42, and a booster module 44. Each sub-assembly 38, 40, 42, 44 may include a housing for components that perform different functions for the air vehicle 36. Other suitable configurations of the air vehicle 36 may include different sub-assemblies.

Each sub-assembly 38, 40, 42, 44 includes unique components relative to the other sub-assemblies 38, 40, 42, 44 and the sub-assemblies 38, 40, 42, 44 may each include solid and/or liquid energetic materials. The warhead module 38 may include a unitary or tandem warhead system and the jet engine module 42 may include a turbo jet engine. The fuel tank module 40 may contain fuel having a mitigation requirement in which the fuel threat must be converted to an open thermal source rather than a fuel-air explosive. FIG. 3 shows a launch system 48 for the air vehicle 36 that includes a canister 50 in which the air vehicle 36 is stored prior to release. In the launch system 48, the canister 50 may be the environment 12 which includes the mitigation control system 10.

Figure 4:
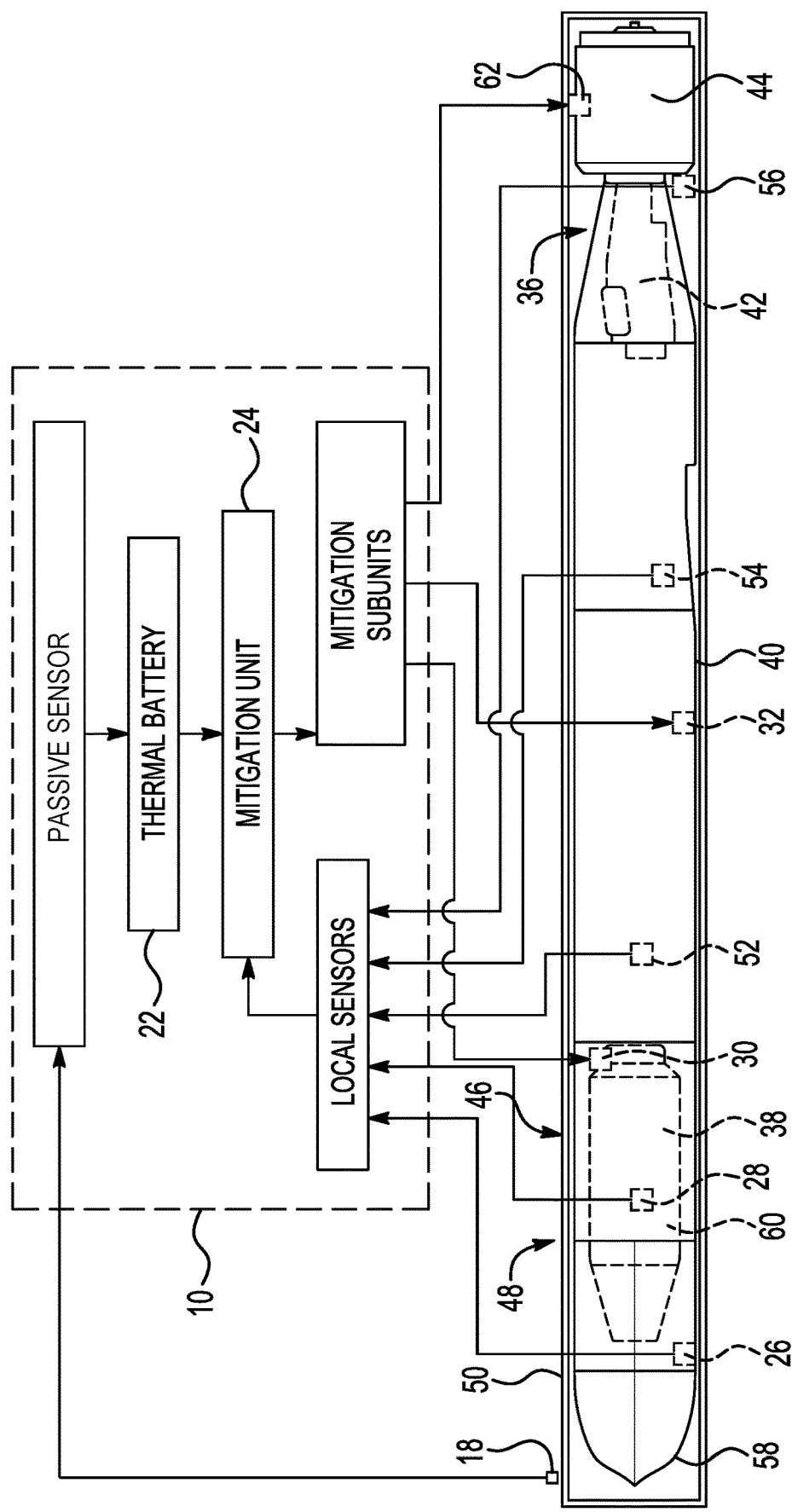
FIG. 4 shows the mitigation control system of FIG. 1 being implemented in the launch system of FIG. 3.

FIG. 4 shows the mitigation control system 10 being implemented in the launch system 48. The abnormal temperature sensor 18 of the mitigation control system 10 is arranged on the canister 50 to detect the abnormal temperature of the environment surrounding the canister 50. Any suitable mounting mechanism may be suitable. The abnormal temperature sensor 18 may be embedded within a wall or housing of the canister 50. In other exemplary embodiments, the abnormal temperature sensor 18 may be arranged on the outer side of the main body 46 of the air vehicle 36 or at a location inside the canister 50. The arrangement of the abnormal temperature sensor 18 is dependent on the application.

When the abnormal temperature exceeds a predetermined abnormal temperature threshold indicating that the air vehicle 36 is subject to an energetic hazard, the abnormal temperature sensor 18 is configured to mechanically trigger the thermal battery 22. Upon actuation of the thermal battery 22, the thermal battery 22 supplies current to the AHMU 24 which may be in a sleep mode prior to receiving current from the thermal battery 22. The AHMU 24 is then actuated and queries the local temperature sensor network including the plurality of local temperature sensors 26, 28, 52, 54, 56 that are each communicatively coupled with the AHMU 24. The local temperature sensors 26, 28, 52, 54, 56 are arranged at different locations within the integrated sub-assemblies 38, 40, 42, 44 of the air vehicle 36. The arrangement of the local temperature sensors 26, 28, 52, 54, 56 may be dependent on the arrangement of the sub-assemblies 38, 40, 42, 44 and the sensors may be arranged within the module housings or directly outside the module housings.

In an exemplary embodiment of the local temperature sensor network or sensor array, some of the local temperature sensors 26, 28 may be arranged in the warhead module 38 and spaced relative to each other. One of the local temperature sensors 26 may be arranged proximate a nose end 58 of the air vehicle 36 and spaced from a payload 60 contained in the warhead module 38. The other local temperature sensor 28 may be arranged on the payload 60 or proximate the payload 60. The fuel tank module 40 may include the local temperature sensor 52, the jet engine module 42 may include the local temperature sensor 54, and the booster module 44 may include the local temperature sensor 56. The local temperature sensors 52, 54, 56 may be arranged proximate a specific component or the temperature sensors may be arranged at any location in the module housing. For example, the temperature sensor 52 may be arranged in a liquid fuel region of the fuel tank module 40 and the temperature sensor 54 may be arranged in a rocket motor of the booster module 44.

When one of the local temperature sensors 26, 28, 52, 54, 56 detects a temperature in the corresponding sub-assembly 38, 40, 42, 44 that exceeds a critical temperature for the sub-assembly 38, 40, 42, 44, i.e. when the temperature is critical to a self-heating reaction, the AHMU 24 activates the mitigation subcontrollers 30, 32, 62 that are arranged in the sub-assemblies 38, 40, 42, 44, respectively. The mitigation subcontrollers 30, 32, 62 then execute the suitable mitigation action for the corresponding sub-assembly 38, 40, 42, 44. The AHMU 24 may be configured to activate any suitable ignitor of the mitigation subcontrollers 30, 32, 62.

In an exemplary embodiment of the mitigation subcontrollers 30, 32, 62, the mitigation subcontroller 32 for the fuel tank module 40 may be configured to execute a multi-step sequence in which the fuel is released by providing a controlled burn without increasing pressure inside the air vehicle 36. The fuel release sequence may be a thermal initiated venting system (TIVS) type of fuel release. Using the mitigation control system 10 is advantageous in that the final triggering sequence for the controlled burn does not occur until the local temperature sensor 52 detects the hazardous threat in the fuel tank module 40, enabling an active burn control.

The mitigation subcontrollers 30, 62 for the warhead module 38 and the booster module 44 may be configured to perform venting for the corresponding sub-assembly 38, 44 to enable clearing of the energetic material from the air vehicle 36. Another mitigation action for the warhead module 38 or the booster module 44 may include taking apart the payload 60 or the rocket motor, such as a TIVS type of motor or warhead cutting. Still another mitigation action that is suitable for any of the sub-assemblies 38, 40, 42, 44 includes any action that enables the energetic material to burn non-propulsively, similar to the burning of a candle. Any suitable passive or active mitigation action may be suitable.

Using the mitigation control system 10 is particularly advantageous in integrated systems such as a cruise missile in that the mitigation control system 10 enables compliance of each individual sub-assembly at a higher system level. The mitigation control system is configured to minimize the probability of an uncontrolled initiation and to minimize the severity of subsequent collateral damage to weapon platforms, logistic systems and personnel due to accidental threats. The abnormal temperature sensor 18 acts as a thermostat which enables the mitigation control system 10 to conserve power until a thermal threat is detected. In contrast to conventional mitigation methods in which a canister may impact the thermal threat characteristics and prohibit subsystem mitigation techniques, the mitigation control system 10 described herein ensures mitigation at the subsystem level when the air vehicle 36 is arranged in the canister 50 of the launch system 48.

Using the mitigation control system 10 in the air vehicle or cruise missile 36 is also advantageous in enabling the reactions to meet a military standard MIL-STD-2105D for energetic responses, which provides that the energetic response must have an ejecta kinetic energy that is less than 20 joules (15 foot-pound force). For example, the requirements may include meeting STANAG 4439 standards. The hybrid passive and active sensor system enables containerized cruise missiles to effectively behave similarly to "wooden rounds" when subject to unplanned external stimuli or thermal threats. The mitigation control system 10 enables a Type V burning reaction or Type VI no reaction per the MIL-STD-2105D energetic response requirements. The Type V burning reaction is the fifth least violent type of munition reaction, as compared with the Type I detonation reaction, Type II partial detonation reaction, Type III explosion reaction, and Type IV deflagration reaction. In the Type V burning reaction, the energetic material ignites and burns non-propulsively. The Type VI no reaction is the least violent type of munition reaction in which any reaction self-extinguishes immediately upon removal of the unplanned external stimuli.

Figure 5:
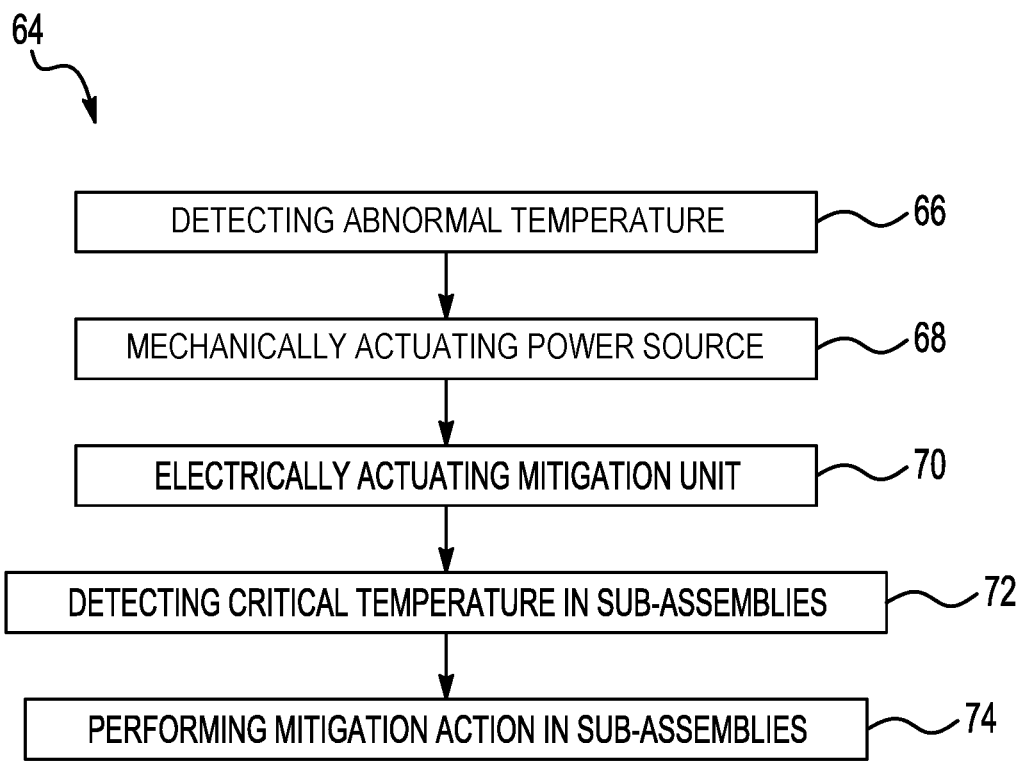
FIG. 5 shows a flow chart for a method for mitigating an active hazard in an air vehicle containing an energetic material using the mitigation control system of FIG. 1.

Referring now to FIG. 5, a method 64 for mitigating an active hazard in the air vehicle 36 of FIGS. 2-4 includes using the mitigation control system 10 shown in FIGS. 1 and 4. Step 66 of the method 64 includes detecting the abnormal temperature of the air vehicle 36 and step 68 includes mechanically actuating the power source 20 when the abnormal temperature exceeds a predetermined abnormal temperature threshold. Step 70 of the method 64 includes electrically actuating the AHMU 24 after the power source 20 is actuated. The thermal battery 22 may be actuated by the abnormal temperature sensor 18 and may subsequently actuate the AHMU 24, such as by supplying current to wake up the AHMU 24 from a sleep mode.

Step 72 of the method 64 includes detecting the critical temperature in the separate sub-assemblies 38, 40, 42, 44 that are integrated to form the air vehicle 36 after the AHMU 24 is actuated. The local temperature sensors 26, 28, 52, 54, 56 may be used to detect a temperature in the corresponding sub-assembly 38, 40, 42, 44 that exceeds a critical temperature for the sub-assembly 38, 40, 42, 44. Step 74 of the method 64 includes executing a mitigation action in at least one of the different sub-assemblies 38, 40, 42, 44 using a corresponding one of the mitigation subcontrollers 30, 32, 62 when the critical temperature in the corresponding sub-assembly 38, 40, 42, 44 exceeds the predetermined critical temperature threshold.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (external components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A mitigation control system arranged in an environment containing an energetic material, the mitigation control system comprising:
   an abnormal temperature sensor for detecting an abnormal temperature of the environment;
   a power source that is mechanically actuated by the abnormal temperature sensor when the detected temperature exceeds a predetermined temperature threshold;
   a mitigation controller that is electrically actuated by the power source; and
   a plurality of local temperature sensors that are communicatively coupled to the mitigation controller and are arranged for detecting critical temperatures in specific regions of the environment, wherein the mitigation controller initiates a mitigation action when one of the critical temperatures in a corresponding one of the specific regions exceeds a predetermined critical temperature threshold.

2. The mitigation control system according to claim 1, wherein the abnormal temperature sensor is a passive sensor and the plurality of local temperature sensors are active sensors.

3. The mitigation control system according to claim 1, wherein the power source includes a self-contained battery or power from an external source.

4. The mitigation control system according to claim 3, wherein the mitigation controller has a sleep mode and the thermal battery is configured to supply current to the mitigation controller for transitioning the mitigation controller to a power on mode from the sleep mode.

5. The mitigation control system according to claim 1 further comprising a plurality of mitigation subcontrollers that are each arranged in different specific regions of the environment and configured to execute a predetermined mitigation action or technique for the corresponding specific region.

6. The mitigation control system according to claim 1, wherein the mitigation action or technique is passive or active.

7. The mitigation control system according to claim 6, wherein the passive action or technique includes at least one of venting, shielding, painting, using shear bolts or stress raisers, and softening a component within the environment.

8. The mitigation control system according to claim 6, wherein the active action or technique includes at least one of igniting the energetic material below an ignition temperature for the energetic material, using a thermal initiated venting system for fuel release or component cutting, performing a controlled burn, controlling a location of ignition within the environment, performing an early ignition of the energetic material, and weakening a component within the environment.

9. The mitigation control system according to claim 6, wherein the environment is a transportation vehicle.

* * * * *